US010458836B2

(12) United States Patent
Porras et al.

(10) Patent No.: US 10,458,836 B2
(45) Date of Patent: Oct. 29, 2019

(54) ELECTRICAL CONNECTION HAVING A GOLD CONTACT SURFACE WITH DISCRETE AREAS OF HARDNESS AND FUEL LEVEL SENSOR USING THE SAME

(71) Applicant: DELPHI TECHNOLOGIES IP LIMITED, St. Michael (BB)

(72) Inventors: Luis M. Porras, Chihuahua (MX); Isai Chavez, Anthony, NM (US); Michael Joseph McHale, El Paso, TX (US)

(73) Assignee: DELPHI TECHNOLOGIES IP LIMITED (BB)

( * ) Notice: Subject to any disclaimer, the term of this patent is extended or adjusted under 35 U.S.C. 154(b) by 222 days.

(21) Appl. No.: 15/598,680

(22) Filed: May 18, 2017

(65) Prior Publication Data

US 2018/0335333 A1 Nov. 22, 2018

(51) Int. Cl.
*G01F 23/36* (2006.01)
*H01R 35/04* (2006.01)
*H01R 12/71* (2011.01)
*H01R 4/62* (2006.01)
*G01F 23/76* (2006.01)
*G01F 23/32* (2006.01)
*G01D 5/165* (2006.01)
*H01C 10/32* (2006.01)

(52) U.S. Cl.
CPC ......... *G01F 23/363* (2013.01); *G01D 5/165* (2013.01); *G01F 23/32* (2013.01); *G01F 23/36* (2013.01); *G01F 23/76* (2013.01); *H01C 10/32* (2013.01); *H01R 4/62* (2013.01); *H01R 12/714* (2013.01); *H01R 35/04* (2013.01)

(58) Field of Classification Search
CPC .......... G01F 23/30; G01F 23/32; G01F 23/36; G01F 23/363; H01C 10/32
USPC .................................. 73/305, 313, 314, 317
See application file for complete search history.

(56) References Cited

U.S. PATENT DOCUMENTS

| | | | |
|---|---|---|---|
| 6,571,627 B2 | 6/2003 | Yasuda et al. | |
| 6,681,628 B2 | 1/2004 | Sawert et al. | |
| 6,886,403 B2 | 5/2005 | LaBarge et al. | |
| 2004/0196137 A1 | 10/2004 | Dedert et al. | |
| 2012/0103090 A1* | 5/2012 | Oike | G01F 23/36 73/317 |
| 2012/0186340 A1 | 7/2012 | Shimizu et al. | |

(Continued)

*Primary Examiner* — Benjamin R Schmitt
(74) *Attorney, Agent, or Firm* — Joshua M. Haines (57) ABSTRACT

An electrical connection includes a first electrical conductor assembly having a first electrical conductor with a first electrical conductor surface and a second electrical conductor assembly having a second electrical conductor with a second electrical conductor surface which is engaged with the first electrical conductor surface such that the second electrical conductor assembly and the first electrical conductor assembly reciprocate relative to each other along a path. The first electrical conductor surface and the second electrical conductor surface provide electrical communication between the first electrical conductor assembly and the second electrical conductor assembly along the path. The second electrical conductor surface has a first area of gold having a first magnitude of hardness which engages the first electrical conductor surface and also has a second area of gold having a second magnitude of hardness which is greater than the first magnitude of hardness.

17 Claims, 6 Drawing Sheets

(56) References Cited

U.S. PATENT DOCUMENTS

2012/0186341 A1 7/2012 Oike et al.
2013/0025366 A1 1/2013 Oike et al.

\* cited by examiner

ELECTRICAL CONNECTION HAVING A GOLD CONTACT SURFACE WITH DISCRETE AREAS OF HARDNESS AND FUEL LEVEL SENSOR USING THE SAME

TECHNICAL FIELD OF INVENTION

The present invention relates an electrical connection; more particularly to an electrical connection having a first electrical conductor with a first electrical conductor surface which mates with a second electrical conductor surface of a second electrical conductor; even more particularly to such an electrical connection where the second electrical conductor surface has a first area of gold having a first hardness and a second area of gold having a second hardness; and still even more particularly to a fuel level sensor which includes such an electrical connection.

BACKGROUND OF INVENTION

Fuel tanks which hold a volume of fuel, for example gasoline or diesel fuel, to be supplied to an internal combustion engine of a motor vehicle are known to include a fuel level sensor which generates a signal indicative of the fuel level within the fuel tank. The signal is provided to a fuel level gauge which delivers a visual display to an operator of the motor vehicle to keep the operator informed of the quantity of fuel remaining in the fuel tank. One known fuel level sensor includes a ceramic card with a resistive circuit disposed thereon and also includes a wiper assembly which makes sliding contact with the resistive circuit. The wiper assembly is attached to a float which changes the position of the wiper assembly on the resistive circuit. Consequently, when an electric current is applied to an input side of the wiper assembly, the signal resulting at an output side of the wiper assembly will vary depending on the position of the wiper assembly relative to the resistive circuit. One such fuel level sensor is illustrated in U.S. Pat. No. 6,681,628 to Sawert et al., the disclosure of which is incorporated herein by reference in its entirety.

The sliding interface between the resistive circuit and the wiper assembly, and the harsh environment within which the fuel level sensor is located, present challenges in durability. Consequently, precious metals are commonly used to survive the harsh environment and provide good electrical contact. In one known arrangement, the wiper assembly includes a soft gold contact surface which engages the resistive circuit which is silver-based. While this arrangement limits gold, which is relatively expensive, to the wiper assembly, soft gold may have a shorter service life than is desirable. In another known arrangement, the wiper assembly includes a hard gold contact surface which engages the resistive circuit. While the hard gold contact surface increases the durability of the wiper assembly, the service life of the silver-based resistive circuit may be shorter than is desirable due to the hard gold with which the silver-based resistive circuit interfaces. Consequently, when a hard gold contact surface is used on the wiper assembly, it is typical for the resistive circuit to be gold-based in order to provide an acceptable service life since the gold-on-gold sliding interaction is more durable than the gold-on-silver sliding interaction. While fuel level sensors which include a wiper assembly having a hard gold contact surface and a gold-based resistive circuit on the ceramic card provide a satisfactory service life, the cost of such an arrangement may be prohibitive to implement because of the increased amount of gold in the fuel level sensor.

What is needed is an electrical connection and a fuel level sensor which minimizes or eliminates one or more of the shortcomings as set forth above.

SUMMARY OF THE INVENTION

Briefly described, an electrical connection includes a first electrical conductor assembly having a first electrical conductor with a first electrical conductor surface and a second electrical conductor assembly having a second electrical conductor with a second electrical conductor surface which is engaged with the first electrical conductor surface such that the second electrical conductor assembly and the first electrical conductor assembly reciprocate relative to each other along a path, the first electrical conductor surface and the second electrical conductor surface thereby providing electrical communication between the first electrical conductor assembly and the second electrical conductor assembly along the path. The second electrical conductor surface has a first area of gold having a first magnitude of hardness which engages the first electrical conductor surface and also has a second area of gold having a second magnitude of hardness which is greater than the first magnitude of hardness. The second electrical conductor assembly may be included in a fuel level sensor. The second electrical conductor surface having areas of gold with discrete magnitudes of harness allows for the softer areas of gold to deposit on the first electrical conductor surface while the harder areas of gold provide where resistance for the second electrical conductor assembly. Furthermore, since the softer gold becomes deposited on the first electrical conductor surface as the softer gold wears, the first electrical conductor surface can be formed free of gold, thereby allowing the electrical connection to be formed more economically.

BRIEF DESCRIPTION OF DRAWINGS

This invention will be further described with reference to the accompanying drawings in which.

DETAILED DESCRIPTION OF INVENTION

Figure 1:
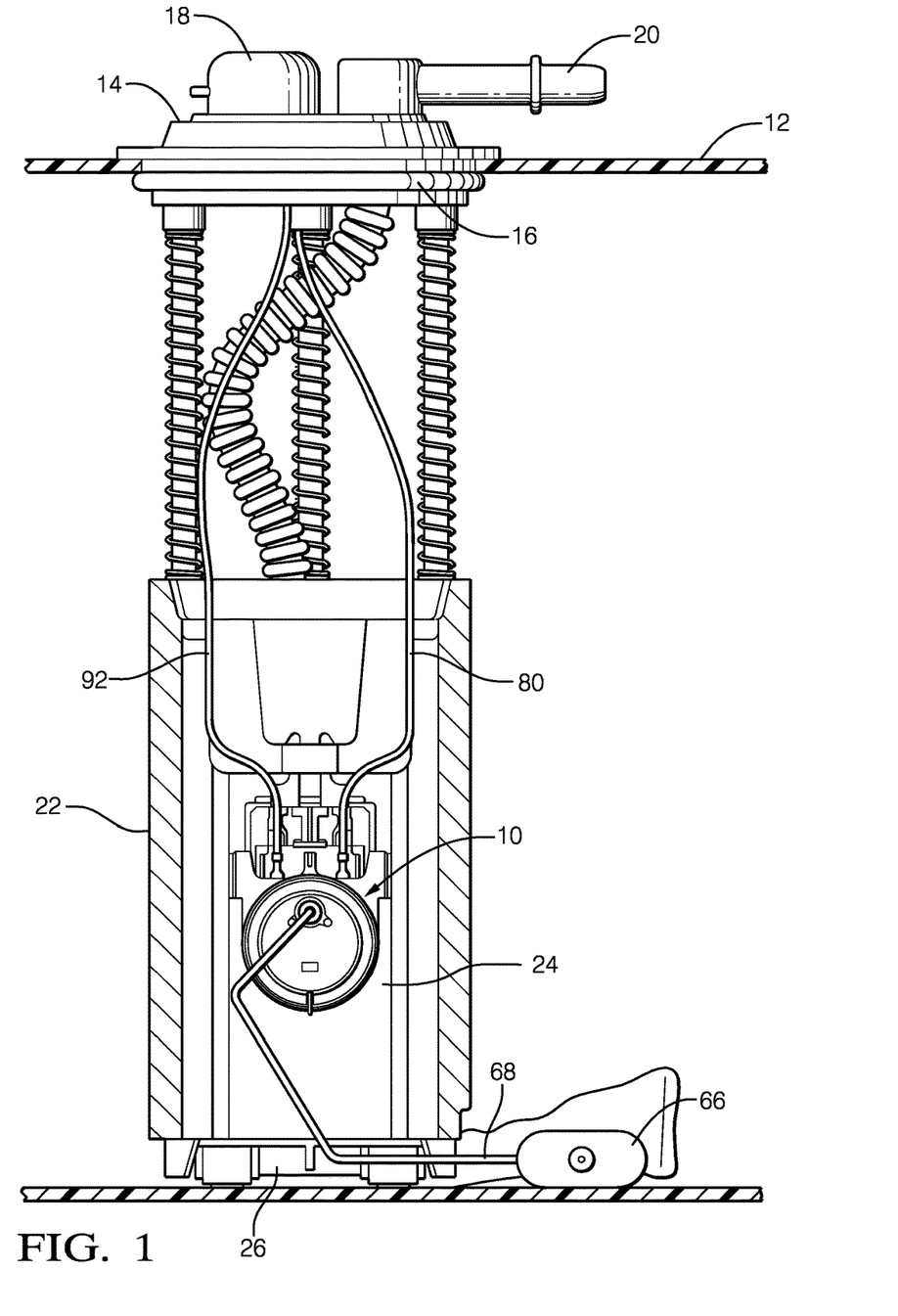
FIG. 1 an elevation view of a fuel module which incorporates the present invention.

Referring to the drawings, and initially in particular FIG. 1 which illustrates an implementation of the present invention, a fuel level sensor 10 is shown for a fuel tank 12 (partially shown) of a vehicle (not shown). The fuel tank 12 includes a fuel pump module 14 therein with a removable cover 16 sealed to the top of fuel tank 12 with an electrical connector 18 and a fuel line outlet connector 20. Fuel pump module 14 includes a fuel reservoir 22 that contains an electrical fuel pump 24 with an inlet 26 and fuel level sensor 10 to indicate fuel level in the fuel tank 12.

Figure 2:
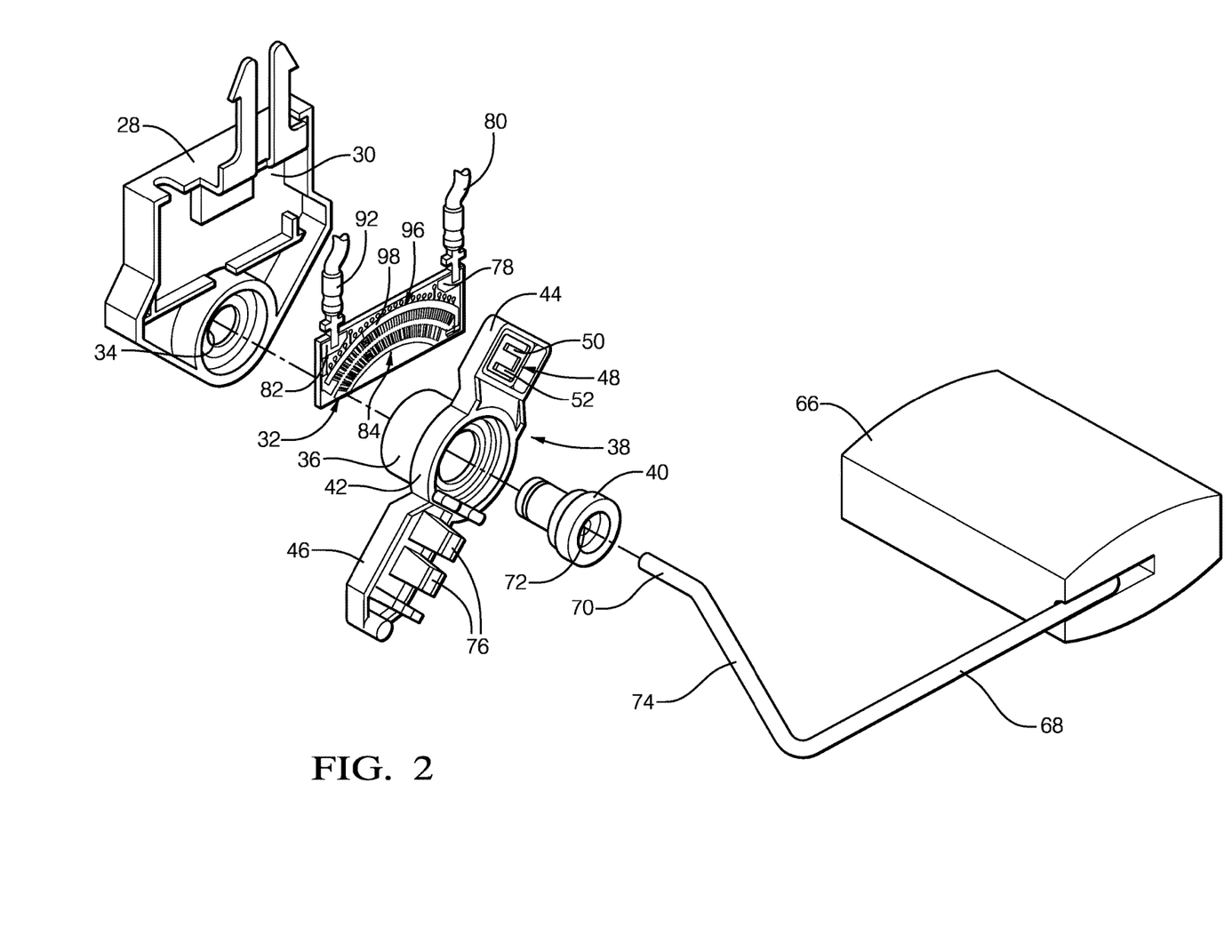
FIG. 2 is an exploded isometric view of a fuel level sensor of the fuel module of FIG. 1.
Figure 3:
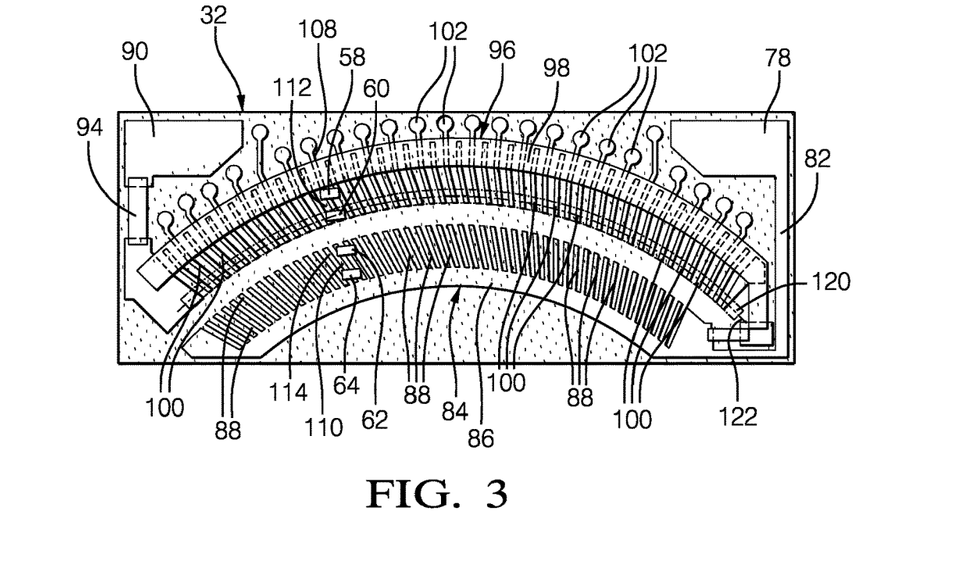
FIG. 3 is a face-on view of a resistor card of the fuel level sensor of FIG. 2.
Figure 4:
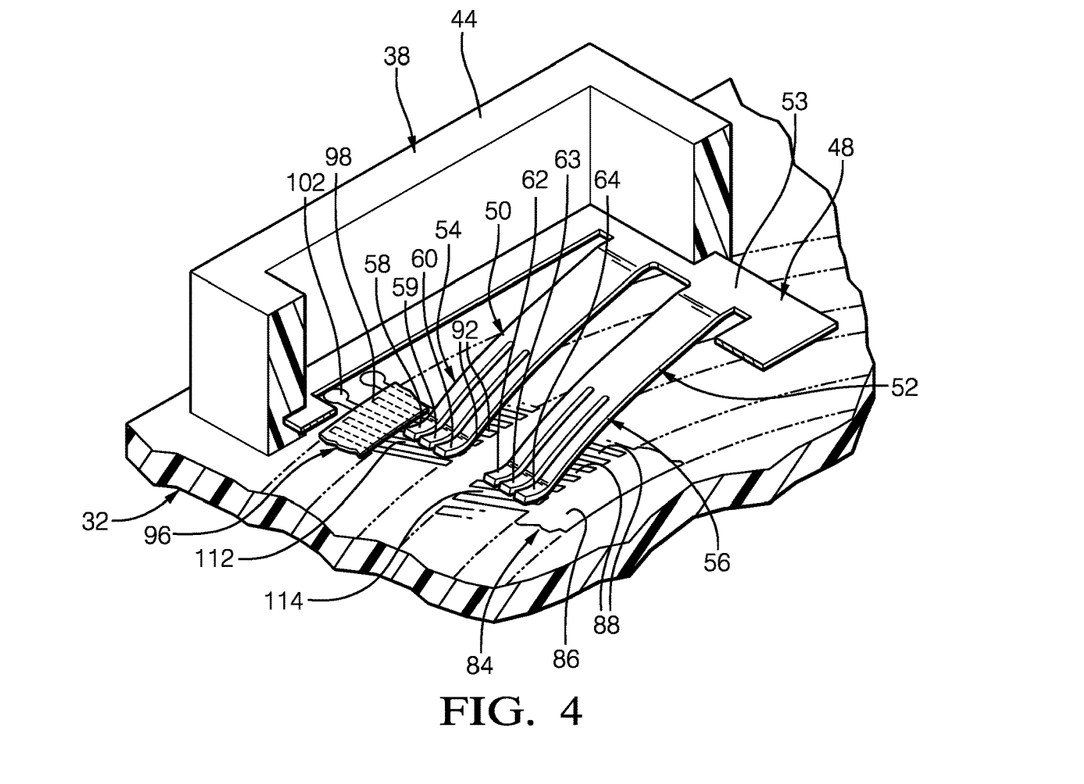
FIG. 4. is an isometric view of a portion of the resistor card of FIG. 3 together with a wiper assembly of the fuel level sensor of FIG. 2.
Figure 5:
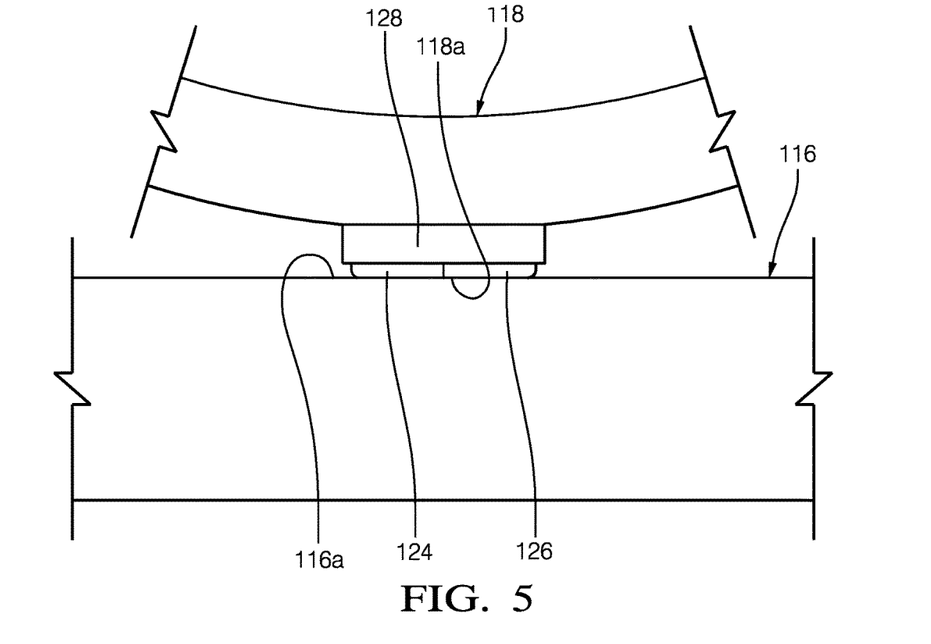
FIG. 5 is an elevation view which enlarges a portion of the resistor card and wiper assembly of FIG. 4.

With continued reference to FIG. 1, but now with emphasis on FIGS. 2-4, fuel level sensor 10 includes a housing 28 having a recess 30 therein for carrying a resistor card 32. Housing 28 also has a recess or hole 34 therein for a hollow male portion 36 of a wiper assembly 38. Wiper assembly 38 is pivotally connected to housing 28 with the aid of a bushing 40, which extends through hollow male portion 36. Wiper assembly 38 includes a body portion 42 from which hollow male portion 36 extends, an upper head portion 44 and a lower leg portion 46. Upper head portion 44 carries a contact assembly 48 including a first arm 50 and a second arm 52 which are spaced apart and parallel and which are connected together by a bridge 53. First arm 50 has a first set of fingers 54, identified individually as fingers 58, 59, 60, which are spaced apart and parallel to each other and extend outwardly from first arm 50. Similarly, second arm 52 has a second set of fingers 56, identified individually as fingers 62, 63, 64, which are spaced apart and parallel to each other and extend outwardly from second arm 52. Both sets of fingers 54, 56 are positioned to travel in an arc-shaped path consistent with a resistive path 96 or a conductive path 84 on the ceramic card as will be described hereafter.

A float 66 is provided for vertical movement in fuel tank 12 and a lever 68 extends therefrom for engagement in bushing 40. Lever 68 extending from float 66 includes a head portion 70, which extends into a hole 72 in bushing 40, and a downwardly extending body portion 74, which is captured, by prongs 76 extending outwardly from lower leg portion 46 of wiper assembly 38. As float 66 moves up and down due to the changes in fuel level, lever 68 extending therefrom causes wiper assembly 38 to rotate.

Resistor card 32 includes a first contact pad 78 having a first wire 80 connected thereto to provide current to first contact pad 78. A conductive line 82 extends along one edge of the resistive card from first contact pad 78 to conductive path 84 which is arc-shaped. Conductive path 84 includes a base portion 86 which is arc-shaped and continuously solid and a plurality of spaced apart conductor lines 88 extending therefrom at an angle with respect to a radial line drawn from the center of the base portion's 86 arc. A second contact pad 90 is provided having a second wire 92 secured thereto. A conductive line 94 extends along an opposite side of resistor card 32 from second contact pad 90 to resistive path 96 which is arc-shaped. Resistive path 96 includes a resistive ink pattern 98, which is arc-shaped, overlying a plurality of spaced apart conductor lines 100 formed at a radial line drawn from the center of the resistive ink pattern's 98 arc. A plurality of small contact pads 102 extends from selective conductor lines 100 of resistive path 96 for purposes of laser trimming resistive path 96.

As float 66 moves up and down with respect to changing fuel levels, lever 68 extending from float 66 causes wiper assembly 38 to rotate. As upper head portion 44 of wiper assembly 38 rotates, first set of fingers 54 on first arm 50 engage conductor lines 100 of resistive path 96 and second set of fingers 64 on second arm 52 engage conductor lines 88 of conductive path 84 which is arc-shaped. With respect to both resistive path 96 and conductive path 84, a top finger 58, 62 of first arm 50 and second arm 52 respectively will engage one of the conductor lines 108, 110 (FIG. 3) and a third finger 60, 64 (parallel to the first finger) on the same arm will contact an adjacent conductor line 112, 114 (FIG. 3) respectively. Thus, because the conductor lines 88, 100 are formed at an angle with respect to a radial line drawn from the center of the arc of resistive pattern 98 or base portion 86 respectively, and fingers 58 and 60, 62 and 64 on first arm 50 and second arm 52 are parallel, the contact arm is simultaneously contacting adjacent conductor lines thus minimizing or eliminating any problem associated with make brake contact of some known resistor cards.

In operation, current is provided through first wire 80 to the first contact pad 78 and flows therefrom to conductive path 84 printed on resistor card 32. Second set of fingers 56 on second arm 52 of contact assembly 48 engage at least two of the conductor lines 110, 114 on conductive path 84. The current then flows across the contact assembly 48 through first arm 50 and first set of fingers 54 to at least two conductor lines 108, 112 on resistive path 96. As the vehicle consumes fuel, float 66 moves with the fuel level, and wiper assembly 38 rotates along conductive path 84 and resistive path 96. Consequently, a variable resistance to current is provided dependent upon where the contact assembly 48 engages resistive path 96.

With particular reference to FIGS. 5-9, the interface between contact assembly 48 and resistor card 32 will now be described where the interface provides for reduced cost compared to the prior art while maintaining durability of fuel level sensor 10. For brevity, since the interface of conductive path 84 and resistive path 96 to respective fingers 58, 59, 60, 62, 63, 64 may each be substantially the same, conductive path 84 and resistive path 96 will be generically referred to as first electrical conductor 116 and each finger 58, 59, 60, 62, 63, 64 will be generically referred to as second electrical conductor 118. In this way, resistor card 32 may be viewed generically as a first electrical conductor assembly having first electrical conductor 116 and wiper assembly 38 may be viewed generically as a second electrical conductor assembly having second electrical conductor 118. First electrical conductor 116 includes a first electrical conductor surface 116a while second electrical conductor 118 includes a second electrical conductor surface 118a such that second electrical conductor surface 118a is engaged with first electrical conductor surface 116a, thereby providing electrical communication between the first electrical conductor assembly, i.e. resistor card 32, and the second electrical conductor assembly, i.e. wiper assembly 38. As should be clear from the previous description of operation, changes of fuel level within fuel tank 12 causes reciprocation of the first electrical conductor assembly and the second electrical conductor assembly relative to each other along a path 120 which is centered about an axis 122 where path 120 and axis 122 are shown by way of example in FIG. 3. As embodied herein, path 120 and axis 122 are arcuate in shape, however, other implementations may result in path 120 and axis 122 being linear or some other shape.

Figure 6:
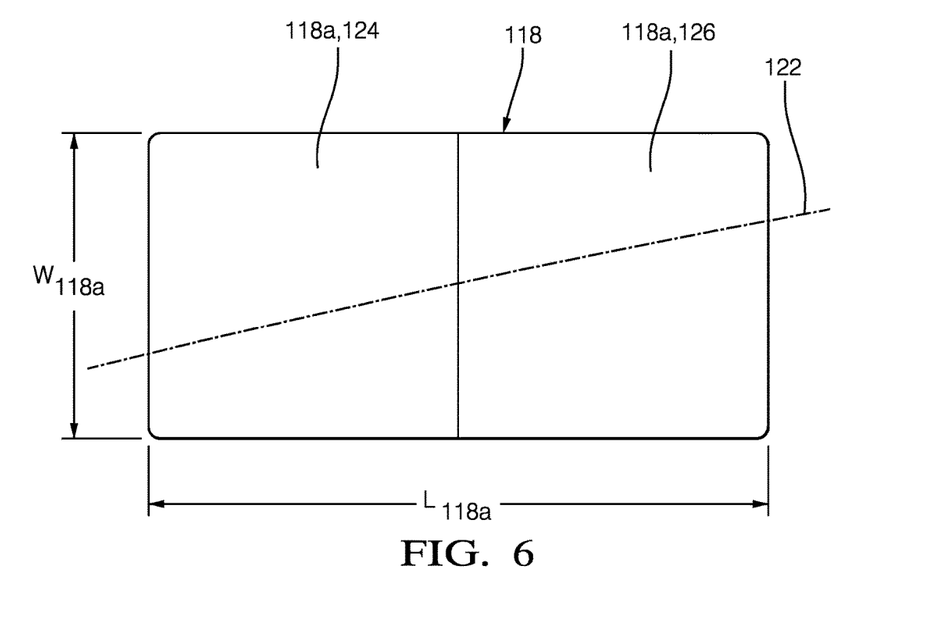
FIGS. 6-9 are face-on views of an electrical conductor surface of the wiper assembly.
Figure 7:
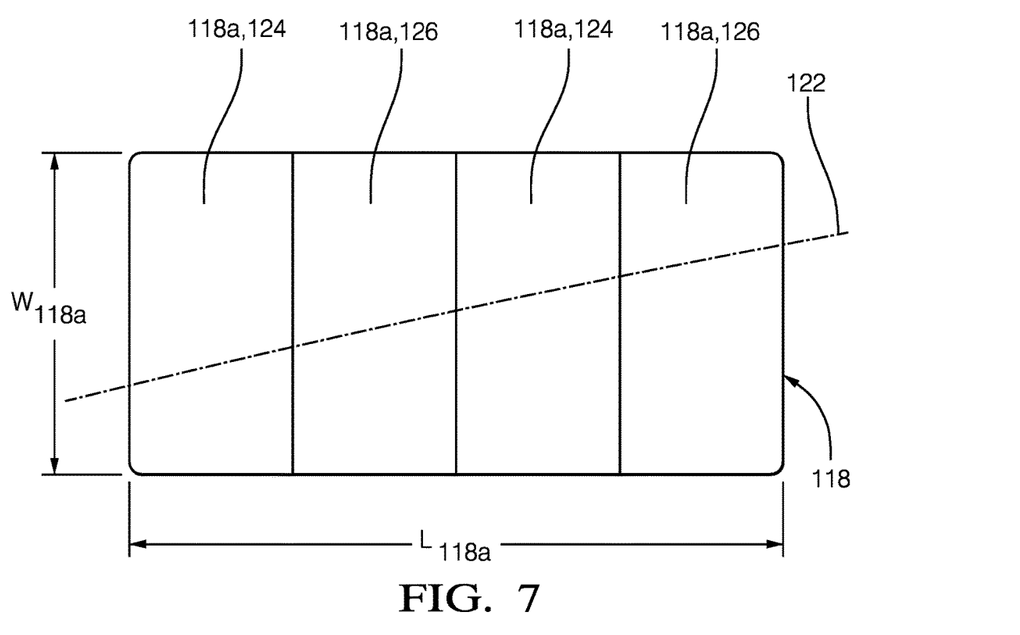

Second electrical conductor surface 118a will now be described with particular reference to FIGS. 5-8 where second electrical conductor surface 118a includes a first area of gold 124 having a first magnitude of hardness and also includes a second area of gold 126 having a second magnitude of hardness which is greater than the first magnitude of hardness of first area of gold 124. It should be noted that first area of gold 124 and second area of gold 126 are not visible in FIGS. 1-4. As used herein, first area of gold 124 and second area of gold 126 are each elemental gold or alloys thereof where gold makes up at least 50% of the alloy by weight. First area of gold 124 is preferably soft gold with a Knoop hardness in the range of 60-85 HkN and second area of gold 126 is preferably hard gold with a Knoop hardness in the range of 120-300 HkN. Furthermore, second area of gold 126 may be a gold alloy comprising 99.7%-99.9% gold with small amounts of nickel and/or cobalt to achieve the desired harness. Second electrical conductor surface 118a has a width $W_{118a}$ which traverses axis 122 and a length $L_{118a}$ which is perpendicular to width $W_{118a}$. As illustrated in FIG. 6, first area of gold 124 extends uninterrupted for width $W_{118a}$ for a portion of length $L_{118a}$ while second area of gold 126 extends uninterrupted for width $W_{118a}$ for the remainder of length $L_{118a}$. FIG. 7 illustrates a variation to FIG. 6 where first area of gold 124 is divided into a plurality of bands and second are of gold 126 is divided into a plurality of bands such that the bands are arranged in an alternating pattern of bands of first area of gold 124 and second area of gold 126. Other patterns of first area of gold 124 and second area of gold 126 are also possible, for example, a checkerboard pattern of first area of gold 124 and second area of gold 126. Consequently, reciprocation of the first electrical conductor assembly and the second electrical conductor assembly relative to each other results in first area of gold 124 and second area of gold 126 passing over a common area of first electrical conductor surface 116a. Repeated reciprocation of the first electrical conductor assembly and the second electrical conductor assembly relative to each other over time causes first area of gold 124 to wear more rapidly than second area of gold 126, due to the differences in hardness, thereby depositing a protective layer of gold from first area of gold 124 on first electrical conductor surface 116a which protects first electrical conductor surface 116a. In this way, first electrical conductor 116 and second electrical conductor 118 are provided with a long service life without the need to produce first electrical conductor surface 116a with gold.

In order to manufacture second electrical conductor surface 118a, gold wires may be rolled onto a substrate 128 (only visible in FIG. 5), which may be by way of non-limiting example only a nickel-based substrate, thereby shaping the wires into first area of gold 124 and second area of gold 126 and bonding first area of gold 124 and second area of gold 126 to substrate 128. More specifically, a first gold wire (not shown) having the desired hardness of first area of gold 124 and a second gold wire (not shown) having the desired harness of second area of gold 126 are rolled onto substrate 128 under a compressive force, thereby shaping the wires to form first area of gold 124 and second area of gold 126 and also thereby bonding the first area of gold 124 and second area of gold 126 to substrate 128. Substrate 128 may then be bonded to second electrical conductor 118, by way of non-limiting example only, by welding.

Figure 8:
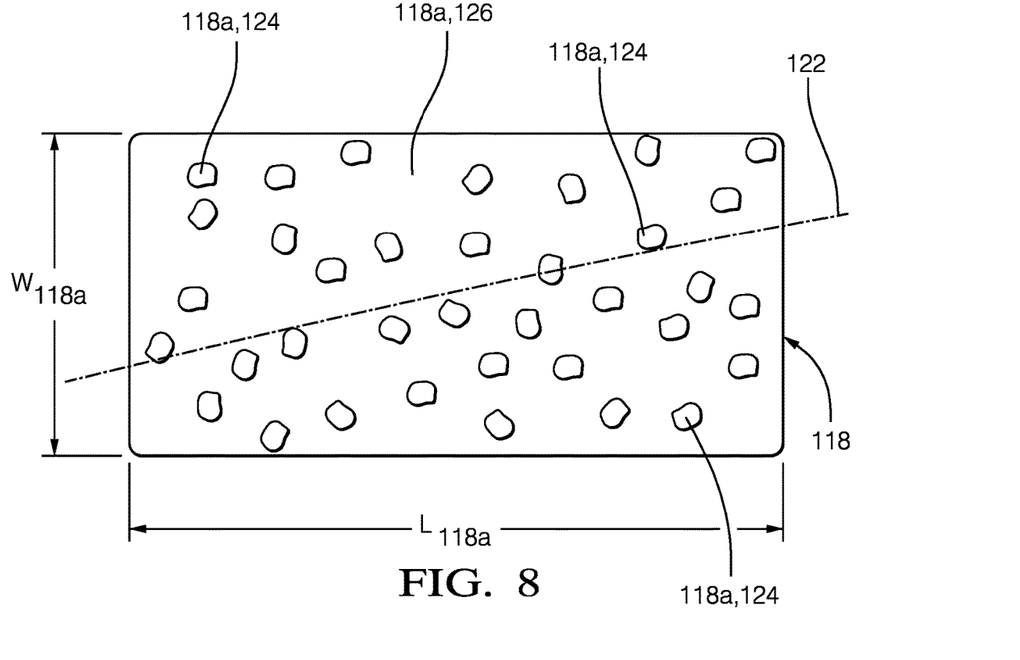
Figure 9:
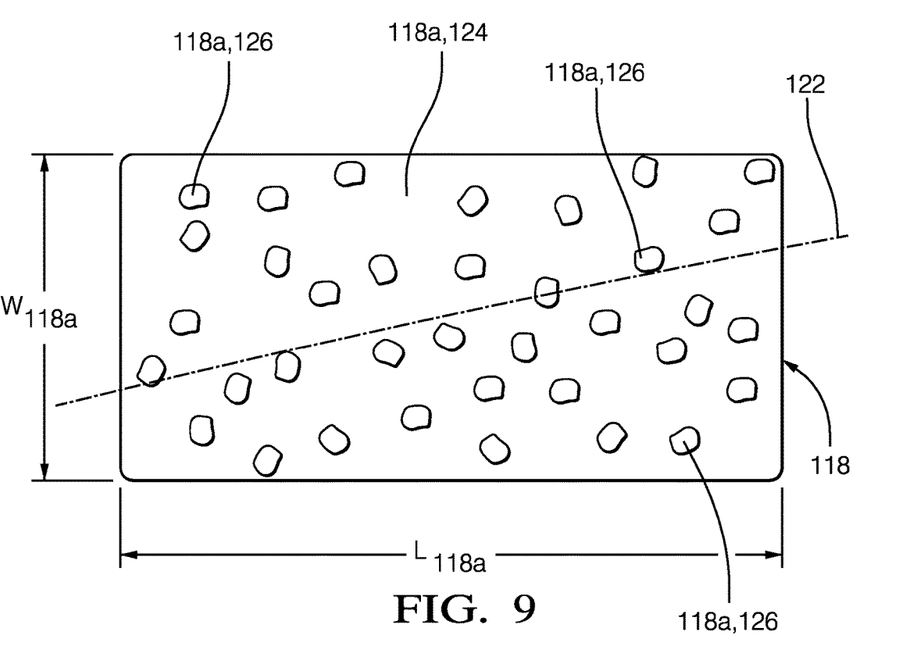

As shown in FIGS. 8 and 9, first area of gold 124 and second area of gold 126 are provided in an alternative manner. More specifically, with respect to FIG. 8, a plurality of first areas of gold 124 are provided where each first area of gold 124 is individually circumferentially surrounded by second area of gold 126. For clarity, only some first areas of gold 124 have been labeled in the figure. This arrangement may be produced by starting with second area of gold 126 which is free of first areas of gold 124 and topologically applying first areas of gold 124, for example in the form of gold flakes, nodules, or powder, to second area of gold 126 and applying pressure to first areas of gold 124, for example by rolling, to embed first areas of gold 124 into second area of gold 126. While first areas of gold 124 have been illustrated as being placed random in nature, a regular pattern of first areas of gold 124 is also contemplated. In an alternative method of production, first areas of gold 124 may be blended with second area of gold 126. In this way, first areas of gold 124 are not merely topologically applied, but some portions of first areas of gold 124 may be completely encapsulated within second area of gold 126, but may become exposed with wear of second electrical conductor surface 118a. FIG. 9 is similar to FIG. 8, except that the positions of first area of gold 124 and second area of gold 126 have been reversed. Consequently, second areas of gold 126 are each individually circumferentially surrounded by first area of gold 124. The arrangements of FIGS. 8 and 9 provide the same benefit that the arrangements of FIGS. 6 and 7 provide, namely, reciprocation of the first electrical conductor assembly and the second electrical conductor assembly relative to each other results in the first area(s) of gold 124 and the second area(s) of gold 126 passing over a common area of first electrical conductor surface 116a. Repeated reciprocation of the first electrical conductor assembly and the second electrical conductor assembly relative to each other over time causes first area(s) of gold 124 to wear more rapidly than second area(s) of gold 126, due to the differences in hardness, thereby depositing a protective layer of gold from first area(s) of gold 124 on first electrical conductor surface 116a which protects first electrical conductor surface 116a. In this way, first electrical conductor 116 and second electrical conductor 118 are provided with a long service life without the need to produce first electrical conductor surface 116a with gold.

While the invention has been embodied herein in terms of an electrical connection of fuel level sensor 10, it should now be understood that providing a contact surface with discrete areas of gold of different magnitudes of harness may be beneficial in other usages where two contact surfaces are subject to repeated relative movement with respect to each other.

While this invention has been described in terms of preferred embodiments thereof, it is not intended to be so limited, but rather only to the extent set forth in the claims that follow.

We claim:

1. An electrical connection comprising:
   a first electrical conductor assembly having a first electrical conductor with a first electrical conductor surface; and
   a second electrical conductor assembly having a second electrical conductor with a second electrical conductor surface which is engaged with said first electrical conductor surface such that said second electrical conductor assembly and said first electrical conductor assembly reciprocate relative to each other along a path, said first electrical conductor surface and said second electrical conductor surface thereby providing electrical communication between said first electrical conductor assembly and said second electrical conductor assembly along said path;
   wherein said second electrical conductor surface has a first area of gold having a first magnitude of hardness which engages said first electrical conductor surface and also has a second area of gold having a second magnitude of hardness which is greater than said first magnitude of hardness and which engages said first electrical conductor surface.

2. The electrical connection in accordance with claim 1, wherein reciprocation of said second electrical conductor assembly relative to said first electrical conductor assembly causes said first area of gold and said second area of gold to pass over a common area of said first electrical conductor surface.

3. The electrical connection in accordance with claim 2, wherein said first area of gold has a Knoop harness in the range of 60-85 HkN and said second area of gold has a Knoop hardness in the range of 120-300 HkN.

4. The electrical connection in accordance with claim 2, wherein:

said path is centered about an axis;
said second electrical conductor surface has a width which traverses said axis and a length which is perpendicular to said width;
said first area of gold extends uninterrupted for said width for a portion of said length;
said second area of gold extends uninterrupted for said width for another portion of said length.

5. The electrical connection in accordance with claim 2, wherein said first area of gold is circumferentially surrounded by said second area of gold.

6. The electrical connection in accordance with claim 2, wherein:
said first area of gold is one of a plurality of first areas of gold;
each of said plurality of first areas of gold has said first magnitude of hardness;
each of said plurality of first areas of gold engages said first electrical conductor surface; and
each of said plurality of first areas of gold is individually circumferentially surrounded by said second area of gold.

7. The electrical connection in accordance with claim 2, wherein said second area of gold is circumferentially surrounded by said first area of gold.

8. The electrical connection in accordance with claim 2, wherein:
said second area of gold is one of a plurality of second areas of gold;
each of said plurality of second areas of gold has said second magnitude of hardness;
each of said plurality of second areas of gold engages said first electrical conductor surface; and
each of said plurality of second areas of gold is individually circumferentially surrounded by said first area of gold.

9. The electrical connection in accordance with claim 2, further comprising:
a resistor card upon which said first electrical conductor is disposed; and
a float responsive to fuel level within a fuel tank, said second electrical conductor assembly being reciprocated along said path by said float responding to the fuel level within said fuel tank.

10. The electrical connection in accordance with claim 1, wherein said first area of gold has a Knoop harness in the range of 60-85 HkN and said second area of gold has a Knoop hardness in the range of 120-300 HkN.

11. The electrical connection in accordance with claim 1, wherein:
said path is centered about an axis;
said second electrical conductor surface has a width which traverses said axis and a length which is perpendicular to said width;
said first area of gold extends uninterrupted for said width for a portion of said length;
said second area of gold extends uninterrupted for said width for another portion of said length.

12. The electrical connection in accordance with claim 1, wherein said first area of gold is circumferentially surrounded by said second area of gold.

13. The electrical connection in accordance with claim 1, wherein:
said first area of gold is one of a plurality of first areas of gold;
each of said plurality of first areas of gold has said first magnitude of hardness;
each of said plurality of first areas of gold engages said first electrical conductor surface; and
each of said plurality of first areas of gold is individually circumferentially surrounded by said second area of gold.

14. The electrical connection in accordance with claim 1, wherein said second area of gold is circumferentially surrounded by said first area of gold.

15. The electrical connection in accordance with claim 1, wherein:
said second area of gold is one of a plurality of second areas of gold;
each of said plurality of second areas of gold has said second magnitude of hardness;
each of said plurality of second areas of gold engages said first electrical conductor surface; and
each of said plurality of second areas of gold is individually circumferentially surrounded by said first area of gold.

16. The electrical connection in accordance with claim 1, further comprising:
a resistor card upon which said first electrical conductor is disposed; and
a float responsive to fuel level within a fuel tank, said second electrical conductor assembly being reciprocated along said path by said float responding to the fuel level within said fuel tank.

17. A fuel level sensor comprising:
a resistor card upon which a first electrical conductor is disposed, said first electrical conductor having a first electrical conductor surface;
a wiper assembly upon which a second electrical conductor is disposed, said second electrical conductor having a second electrical conductor surface which is engaged with said first electrical conductor surface such that said first electrical conductor surface and said second electrical conductor surface provide electrical communication between said resistor card and said wiper assembly; and
a float responsive to fuel level within a fuel tank such that said wiper assembly is reciprocated by said float in response to the fuel level within said fuel tank such that said second electrical conductor surface reciprocates along a path on said first electrical conductor surface;
wherein said second electrical conductor surface has a first area of gold having a first magnitude of hardness which engages said first electrical conductor surface and also has a second area of gold having a second magnitude of hardness which is greater than said first magnitude of hardness and which engages said first electrical conductor surface.

* * * * *